United States Patent

Beeteson et al.

[11] Patent Number: 6,052,118
[45] Date of Patent: Apr. 18, 2000

[54] DISPLAY SYSTEM WITH IMAGE SCANNING APPARATUS

[75] Inventors: John Beeteson, Skelmorlie; Andrew Knox, Kilbirnie, both of United Kingdom

[73] Assignee: International Business Machines Corporation, Armonk, N.Y.

[21] Appl. No.: 08/675,008

[22] Filed: Jul. 3, 1996

[30] Foreign Application Priority Data

Dec. 1, 1995 [GB] United Kingdom ............... 9524631

[51] Int. Cl.[7] ................................................ G09G 5/00
[52] U.S. Cl. ................................................ 345/207
[58] Field of Search ........................ 345/30, 32, 207, 345/214, 215, 20, 63, 77, 89, 102

[56] References Cited

U.S. PATENT DOCUMENTS

| | | | |
|---|---|---|---|
| 4,379,292 | 4/1983 | Minato et al. ........................ 345/207 |
| 4,760,389 | 7/1988 | Aoki et al. ........................... 345/207 |
| 5,032,828 | 7/1991 | Hirose et al. ........................ 345/207 |
| 5,097,324 | 3/1992 | Tanaka et al. ....................... 345/207 |
| 5,416,610 | 5/1995 | Kikinis ................................ 345/207 |
| 5,670,985 | 9/1997 | Cappels, Sr. et al. ................ 345/207 |

*Primary Examiner*—Matthew Luu
*Attorney, Agent, or Firm*—Scully, Scott, Murphy & Presser; Jay P. Sbrollini, Esq.

[57] ABSTRACT

A display system comprises a display screen and drive means for scanning a picture onto the display screen in response to a video signal. Image scanning apparatus in the display system comprises photo-detection means optically coupled to the display screen for generating an image signal on detection of any light from the scanned picture reflected back into the display screen by an external article and subsequently internally reflected within the display screen. Storage means stores the image signal detected by the photo-detection means.

16 Claims, 2 Drawing Sheets

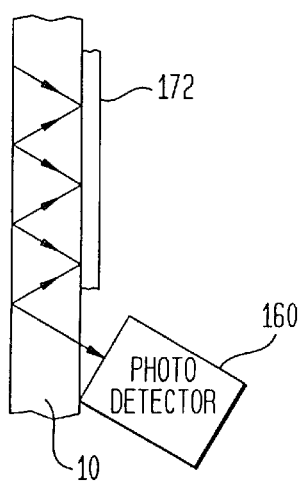
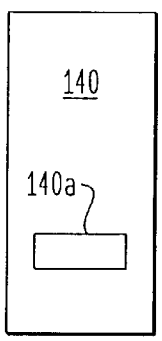
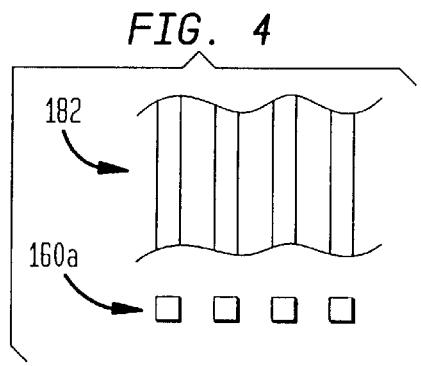
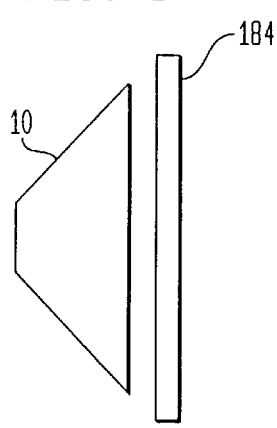
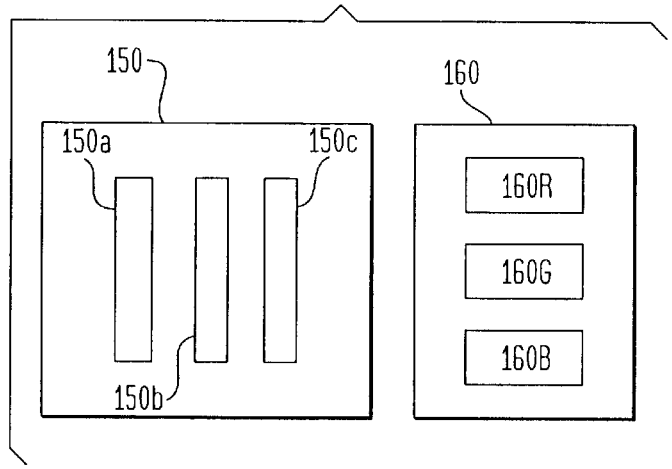

DISPLAY SYSTEM WITH IMAGE SCANNING APPARATUS

BACKGROUND OF THE INVENTION

1. Technical Field

The present invention relates to a display system with integral image scanning apparatus.

2. Prior Art

A conventional personal computer system typically comprises a plurality of components each performing a different function. The components generally include: a desk top or floor standing computer system unit having a processor, data input and output ports, memory, and mass storage means all interconnected by a bus architecture; a display system connected to the data output port to provide a user with a visual output, the display system typically comprising a display screen and drive means for scanning a picture onto the display screen in response to a video signal generated by the system unit; a keyboard and pointing device (such as a mouse, touch screen or the like) connected to the data input port to provide manual control of the computer system; a printer is also typically connected to the data output port to provide hard-copy output from the computer system; and a document scanner connected to the input port for providing input to the computer system from a hard copy document.

It will be appreciated that the aforementioned components of a conventional computer system occupy a large amount of space. It is therefore desirable in the interests of reducing space requirements to limit the number of components required to assemble a computer system by condensing more than one function into a single component.

SUMMARY OF THE INVENTION

In accordance with the present invention, there is now provided a display system comprising a display screen and drive means for scanning a picture onto the display screen in response to a video signal, characterized in that the display system comprises image scanning apparatus comprising photo-detection means optically coupled to the display screen for generating an image signal on detection of any light from the scanned picture reflected back into the display screen by an external article and subsequently internally reflected within the display screen, and storage means for storing the image signal detected by the photo-detection means.

The present invention thus combines the functions of a document scanner and a display system into a single component. This advantageously reduces the space required for assembling a computer system. The present invention stems from a realization that the scanned light pattern produced by refreshing a picture on any display screen, including for example cathode ray tube display screens and liquid crystal display screens, can be utilized to scan a document or other article held against or near to the display screen. Detection of light from the picture scanned onto the display screen, reflected back into the display screen from the document or other article, and then internally reflected within the display screen can be recorded to form a representation of the document or other article in a memory.

Preferably, the image scanning apparatus comprises a controller for generating the video signal. This advantageously permits the display system to generate a video signal for image scanning purposes independently of a host computer system.

The controller preferably comprises image enhancement means for generating the video signal for a current frame as an inverse function of the image signal stored in the frame store during a previous frame. This advantageously permits the display system to recursively enhance the scanned image.

Each pixel of the image signal may be represented in the frame store by an N bit word where N is an integer greater than one. This advantageously permits grey-scale images to be recorded.

Preferably, the image scanning apparatus comprises means for compensating the image signal stored in the frame store for absorption of light by the display screen. This advantageously permits the scanned image to be corrected for differences in path length of the scanned light through the display screen to the photo-detection means.

The image scanning apparatus may comprise means for compressing the image signal detected by the photo-detection means. This advantageously reduces the size of the frame store required for saving the scanned image, and also reduces data volume in the event that the scanned image is to be sent from the display system to a host computer system.

Furthermore, the image scanning apparatus may comprise calibration means connected to the photo-detection means for determining a value indicative of ambient light detected by the photo-detection means and modifying the image signal generated by the photo-detection means as a function of the value.

The photo-detection means preferably comprises at least one photo-detector secured to the display screen.

The image scanning apparatus may also comprise lens means for focusing the picture scanned onto the display screen onto the external article. This advantageously compensates for any de-focusing of the picture by the display screen.

The lens means may comprise a plurality of channels and the photo-detection means comprises a plurality of photo-detectors each optically coupled to a different one of the channels.

The photo-detection means may comprise a plurality of photo-detectors.

The image scanning apparatus may comprises a non-light reflective shutter for supporting the external article adjacent the display screen.

In an embodiment of the present invention, the controller is adapted to sequentially generate video signals corresponding to a red frame, a green frame and a blue frame in series, and the frame store comprises a red plane, a green plane, and a blue plane for storing image signals corresponding to the red frame, the green frame and the blue frame respectively.

In another embodiment of the present invention, the photo-detection means comprises at least one red photo-detector tuned to red light, at least one green photo-detector tuned to green light, and at least one blue photo-detector tuned to blue light, and the frame store comprises a red plane, a green plane, and blue plane for storing image signals generated by the red, green, and blue photo-detectors respectively.

It will be appreciated that the present invention extends to a computer system comprising: a system unit having a processor, memory, mass data storage means, data input and output means, and a display adaptor all interconnected by a bus architecture; and a display system as described herein releasably connectable to the display adaptor.

The computer system may comprise a data communication link between the system unit and the display system for communicating data between the system unit and the image scanning apparatus of the display system.

BRIEF DESCRIPTION OF THE DRAWINGS

Preferred embodiments of the present invention will now be described, by way of example only, with reference to the accompanying drawings in which:

FIG. 2 is a cross section through a screen of the display system showing an example path of a light ray;

FIG. 3 schematically illustrates a calibration means that may be used in the practice of this invention;

FIG. 4 schematically illustrates an array of lens strips and an array of photodetectors that may be used in the present invention;

FIG. 5 illustrates a shutter that may be used with the display system of FIG. 1; and FIG. 6 schematically illustrates a plurality of frame planes and a plurality of photodetectors that may be used in the present invention.

DETAILED DESCRIPTION OF THE PREFERRED EMBODIMENTS OF THE INVENTION

Figure 1:
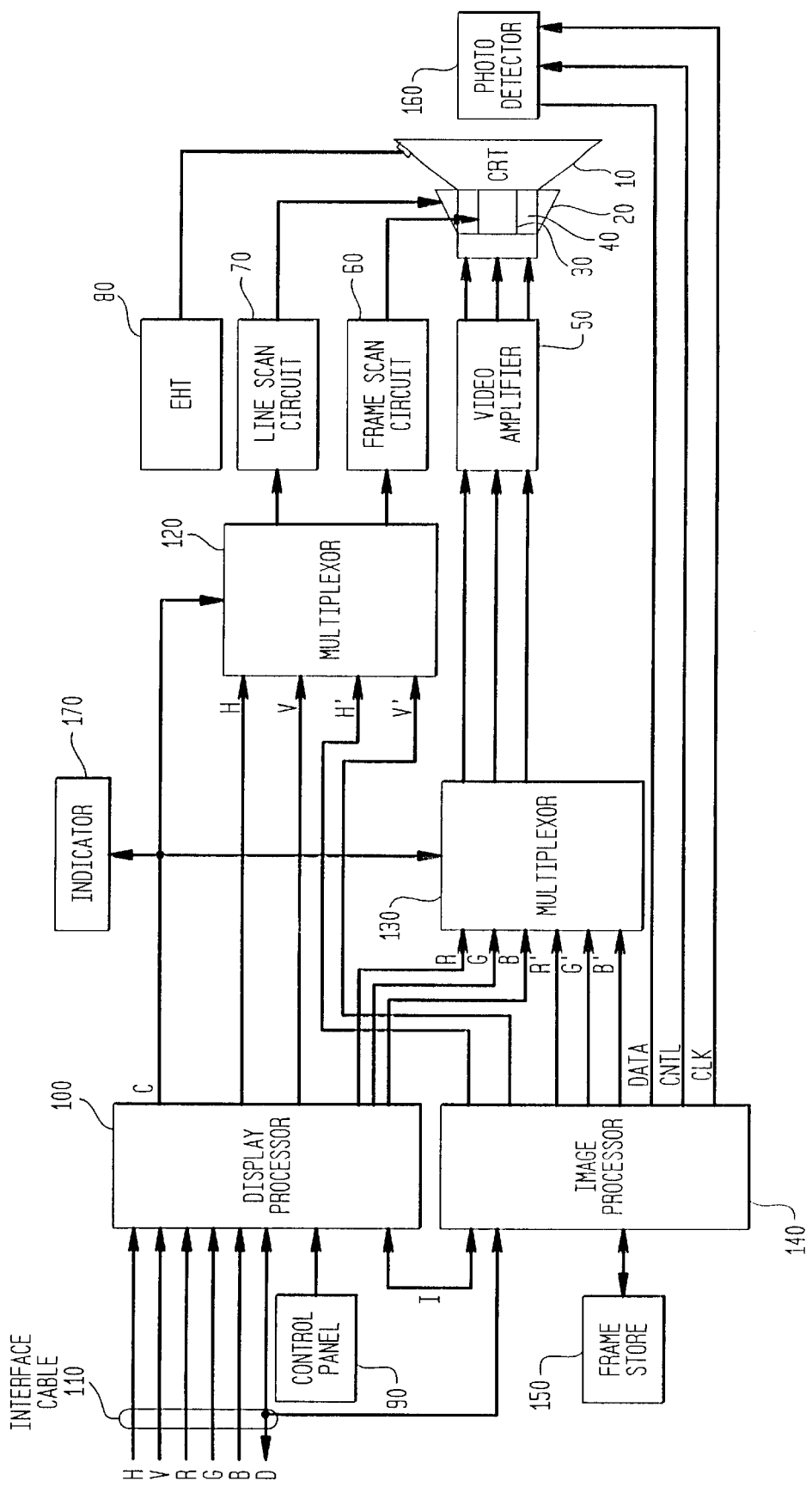
FIG. 1 is a block diagram of an example of a display system embodying the present invention.

Referring to FIG. 1, an example of a display system embodying the present invention comprises a color cathode ray display tube (CRT) 10. A face-plate is attached to the screen of CRT 10. In operation the picture produced by the display system is viewed through the face-plate. CRT 10 is connected to display drive circuitry. Display drive circuitry comprises an Extra High Tension (EHT) generator 80 and a video amplifier 50 connected to CRT 10. Line and frame deflection coils 20 and 30 are disposed around the neck of the CRT 10 on a yoke 40. Deflection coils 20 and 30 are connected to line and frame scan circuits 70 and 60 respectively. Line scan circuit 70 and EHT generator 80 may each be in the form of a flyback circuit, the operation of which is well known by those skilled in the art. Furthermore, as is also well-known in the art, EHT generator 80 and line scan circuit 70 may be integrated in a single flyback circuit. A power supply (not shown) is connected via power supply rails (not shown) to EHT generator 80, video amplifier 50, and line and frame scan circuits 70 and 60. In use, the power supply provides electrical power on the supply rails from Line and Neutral connections (not shown) to the domestic electricity mains supply. The power supply may be in the form of a switch mode power supply, the operation of which is well understood by those skilled in the art.

EHT generator 80, video amplifier 50, and line and frame scan circuits 70 and 60 are each connected to a display processor 100. Display processor 100 includes a microprocessor. A user control panel 90 is provided on the front of the display device. Control panel 90 includes a plurality of manual operable switches. User control panel 90 is connected to key-pad interrupt lines of processor 100.

EHT generator 80 generates an electric field within CRT 10 for accelerating electrons in beams corresponding to the primary colors of red, green and blue towards the screen of CRT 10. Line and frame scan circuits 70 and 60 generate line and frame scan currents in deflection coils 20 and 30. The line and frame scan currents are in the form of ramp signals to produce time-varying magnetic fields that scan the electron beams across the screen of CRT 10 in a raster pattern. The line and frame scan signals are synchronized by line and frame scan circuits 70 and 60 to input line and frame synchronization (sync) signals H and V generated by a video source such as a personal computer system unit, for example. Video amplifier 50 modulates the red, green and blue electron beams to produce an output display on CRT 10 as a function of corresponding red, green and blue input video signals R, G and B also generated by the video source. Sync signals H and V and video signals R, G and B are supplied from the video source to the display apparatus via an interface cable 110. Interface cable 110 also carries a data link D, such a VESA DDC link or the like, between the video source and the display system. Data link D is coupled to processor 100. In operation, data such as control data, test data and the like can be exchanged between processor 100 and the video source via link D. In some embodiments of the present invention, data link D comprises a serial data link. However, it will be appreciated that, in other embodiments of the present invention, data link D may comprise a parallel data link. It will also be appreciated that, while in some embodiments of the present invention, data link D may be integral to interface cable 110, in other embodiments of the present invention, data link D may be external from interface cable 110.

The display system further comprises a 4 into 2 multiplexer 120 having two pairs of inputs. The first pair of inputs is connected to horizontal and vertical sync outputs H and V from display processor 100. The other pair of inputs is connected to horizontal and vertical sync output H' and V' from an image processor 140. Multiplexer 120 has a pair of outputs. One of the outputs is connected to the input of the line scan circuit 70. The other output is connected to the frame scan circuit 60. A 6 into 3 multiplexer 130 has three outputs each connected to a different one of the red, green and blue channels of video amplifier 50. Multiplexer 130 has 6 inputs divided into a pair of triplets. Each input of the first triplet is connected to a different one of three video outputs R, G and B from display processor 100. Each input of the second triplet is connected to a different one of three video outputs R', G', and B' from image processor 140. Multiplexers 120 and 130 each have a control input C connected to a control output of display processor 100. The control output of processor 100 is also connected to an indicator 170. In some embodiments of the present invention, indicator 170 may be a visual indicator such as a light-emitting diode or the like mounted in the bezel of the display system. In other embodiments of the present invention, indicator 170 may be an audio indicator provided by a loudspeaker in the display system. A frame store 150 is connected to image processor 140. Data link D is connected to both image processor 140 and display processor 100. Image processor 140 has a control output CNTL and a clock output CLK connected to a photo-detector 160. A data output DATA from a photo-detector 160 is connected to image processor 140. Photo-detector 160 is optically matched to, and directed towards the face-plate screen of CRT 10. In preferred embodiments of the present invention, photo-detector 160 is attached to the edge of the face-plate. Specifically, photo-detector 160 is preferably located under the bezel of the display in the interests of ergonomic and appealing appearance design. However, it will be understood from the following that, in other embodiments of the present invention, photo-detector 160 may be positioned at different locations in the display system, provided that, when in such positions, photo-detector 160 is capable of detecting light reflected into the face-plate from the document being scanned. It will hence be appreciated that, in some embodiments of the present invention, photo-detector 160 may be remote from the face-plate, but optically connected thereto via, for example, a light guide such as an optical fibre. A frame store 150 is also connected to image processor 140. Display processor 100 and image processor 140 are linked for communication by bus I. Photo-detector 160 comprises an analog to digital convertor (ADC) (not shown) for generating a digital output on the DATA line on detection of light input. The CLK and CNTL lines from image processor 140 control the ADC in use. Image processor 140 comprises a digital to analog convertor (DAC) (not shown) to generate video signals R', G' and B'.

The display system has a conventional display mode of operation and a document scanning mode of operation.

In display mode, display processor 100 is configured to control the outputs of EHT generator 80, video amplifier 50, and line and frame scan circuits 70 and 60 via control links (not shown) as functions of preprogrammed display mode data and inputs from user control 90. The display mode data includes sets of preset image parameter values each corresponding to a different popular display mode such as, for example, 1024×768 pixels, 640×480 pixels, or 1280×1024 pixels. Each set of image display parameter values includes height and centring values for setting the output of frame scan circuit 60; and width and centring values for controlling line scan circuit 70. In addition, the display mode data includes common preset image parameter values for controlling the gain and cut-off of each of the red, green and blue channels of video amplifier 50; and preset control values for controlling the outputs of EHT generator 80. The image parameter values are selected by display processor 100 in response to mode information from the video source. Display processor 100 processes the selected image parameter values to generate analog control levels on the control links.

A user can manually adjust, via user control 90, control levels sent from display processor 100 to the drive circuity to adjust the geometry of the displayed picture according to personal preference. User control panel 90 includes a set of up/down control keys for each of image height, centring, width, brightness and contrast. Each of the keys controls, via display processor 100, a different one or combination of the control levels, such as those controlling red, green and blue video gains and cutoffs at video amplifier 50; and those controlling image width, height, and centring at line and frame scan circuits 70 and 60.

The control keys are preferably in the form of push-buttons connected to key-pad interrupt inputs to display processor 100. When, for example, the "width up" key is depressed, user control panel 90 issues a corresponding interrupt to display processor 100. The source of the interrupt is determined by display processor 100 via an interrupt polling routine. In response to the interrupt from the width key, display processor 100 progressively increases the corresponding analog control level sent to line scan circuit 70. The width of the image progressively increases. When the desired width is reached, the user releases the key. The removal of the interrupt is detected by display processor 100, and the digital value setting the width control level is retained. The height, centring, brightness and contrast setting can be adjusted by the user in similar fashion. User control panel 90 preferably further includes a store key. When the user depresses the store key, an interrupt is produced to which display processor 100 responds by storing in memory parameter values corresponding the current settings of the digital outputs to the corresponding DAC as a preferred display format. The user can thus programme into the display specific display image parameters according to personal preference. It will be appreciated that, in other embodiments of the present invention, user control panel 90 may be provided in the form of an on-screen menu. It will also be appreciated that, in some embodiments of the present invention, the users personal preferences may be automatically saved by processor 100 after a predetermined time interval (a 5 second delay, for example).

A user can switch the mode of operation of the display system between display mode and document scanning mode by entering a corresponding code to display processor 100 via user control panel 90. The code may be provided by depressing a single dedicated key on control panel 90. However, it will be appreciated that, in other embodiments of the present invention, the code may be provided by depressing a combination of keys of user control panel 90, either simultaneously or in sequence. It will also be appreciated that, in other embodiments of the present invention, mode switching may be implemented remotely by a host computer system unit via data link D.

In display mode, display processor 100 sets, via control line C, multiplexer 120 to connect line and frame scan circuits 70 and 60 to horizontal and vertical sync signals H and V from interface cable 110. Also, in display mode, display processor 100 sets, via control line C, multiplexer 130 to connect video amplifier 50 to video signals R, G, and B from interface cable 110. In image scanning mode, on detection of the aforementioned code from user control 90, display processor 100 sets, via control line C, multiplexer 120 to connect line and frame scan circuits 70 and 60 to horizontal and vertical sync signals H' and V' from image processor 140. Also, in image scanning mode, display processor 100 sets, via control line C, multiplexer 130 to connect video amplifier 50 to video signals R', G', and B' from image processor 140. Image processor 140 comprises an alternative CRT controller (CRTC) for controlling the drive circuitry of the display system during image scanning operations. The image scanning operation of the example of the present invention hereinbefore described will now be described in detail.

Referring now to FIG. 2, the electron beams generated in CRT 10 cause phosphor excitation resulting in light output from the screen. In image scanning mode, a document to be scanned is placed in contact with the face-plate of CRT 10. The document is successively illuminated by the light output of the raster-scanned spot produced by the electron beams.

The raster scan is now controlled, via multiplexors 120 and 130, by H', V', R', G', and B' signals generated by image processor 140. The DAC in image processor 140 sets video signals R', G' and B' to generate a uniform white frame on CRT 10. Reflected regions of the scanned document 172 cause some of the incident light to be reflected back towards the face-plate. The reflected portion enters the glass of the face-plate. At least some of the reflected portion is internally reflected within the glass. The impedance mismatch between the glass and the media on either side of the face-plate causes multiple internal reflections of the reflected portion within the glass. The reflected portion is detected by photo-detector 160. Dark regions of the scanned document absorb most of the incident light thereby providing no or minimal reflections. Photo-detector 160 thus produces a signal representative of a negative of the scanned document. The signal is sampled and quantised by the ADC of photo-detector 160 in response to clock and control signals sent to photo-detector 160 from image processor 140 via the CLK and CNTL lines respectively. The quantised signal produced by photo-detector 160 is sent to image processor 140 via the DATA line and stored in frame store 150. The screen of CRT 10 may be at least partially concealed by the document to be scanned. However, indicator 170 is triggered into operation when the control output of display processor 100 is set to select document scanning mode of operation. Indicator 170 thus provides an indication, independently of the screen of CRT 10, that the display system is operating in document scanning mode.

Prior to document scanning, image processor 140 instructs display processor 100 via link I to reduce the brightness of CRT 10 to minimum thereby increasing the contrast ratio. Image processor 140 then obtains a measurement of black level from photo-detector 160 for calibration. Image processor 140 subtracts the recorded black level from detected image data received from photo-detector 160 to remove any offset due to light leakage into the face-plate of CRT 10. The subtraction may be performed prior to storage of the detected image in frame buffer 150. This calibration function of processor 140 is schematically represented at 140a in FIG. 3.

In the arrangement described in the preceding paragraph, photo-detector 160 acts as a point sensor detecting a 2 dimensional object. However, the electron beams causing light output from the face-plate of CRT 10 also acts as a point source. The raster scan of the spot covers a two dimensional area. Image processor 140 records the time-varying output of photo-detector 160 from the DATA line in synchronization with the scanned spot to construct a two dimensional image of the scanned document in frame store 150.

The thickness of the face-plate may be such that the CRT spot is not focused onto the document to be scanned, thereby de-focusing the recorded image. The coarseness of the recorded image depends on the level of de-focusing by the face-plate. The degree of de-focusing may be sufficient to impair the quality of recording of detailed documents. This problem is solved in a modification to the preferred embodiment of the present invention hereinbefore described by providing an overlay between the face-plate of CRT 10 of the document to be scanned. The overlay comprises an array of micro-lenses. In operation, the micro-lenses focus the scanning spot onto the document to be scanned thereby reducing any de-focusing imposed by the thickness of the face-plate. In another modification to the example of the present invention hereinbefore described, the lenses in the overlay are formed into strips schematically represented at 180 in FIG. 4, to channel reflected light towards photo-detector 160. In some embodiments of the present invention, especially those which comprise a flat panel display screen such as a liquid crystal display, each strip may terminate in a different one of an array of photo-detectors associated with an ADC. The array of photo-detectors are arranged orthogonally schematically represented at 182 in FIG. 4, to the scan direction. The CLK and CNTL lines, in addition to controlling the ADC also control addressing of photo-detectors. Because the array of photo-detectors permits an entire row to be scanned at a time, the display screen need not be raster-scanned. This produces a significant improvement in scanning period. It will be appreciated that the array of photo-detectors may be arranged in a row or in a column depending on the scan direction. It will also be appreciated that, in general, replacing photo-detector 160 with a plurality of photo-detectors enhances the signal to noise ratio of the scanning apparatus.

In another modification to the preferred embodiment of the present invention hereinbefore described, a shutter is placed across the face-plate to prevent ambient light reaching the face-plate. The document to be scanned is positioned between the shutter schematically represented at 184 in FIG. 5, and the face-plate. The shutter is formed from a non-reflective (e.g.: black) material. The contrast range available at photo-detector 160 determines the signal to noise ratio of the scanning apparatus. The shutter improves the signal to noise ratio by preventing ambient light from reaching the screen. The shutter may be adapted to hold the document close to or in contact with the face-plate. In other embodiments of the present invention, the shutter may include a light-reflective surface which, in use faces the face-plate to permit for example, scanning of transparencies. It will also be appreciated that the reflective surface may be utilized for calibrating the image processing system.

In yet another modification of the preferred embodiment of the present invention hereinbefore described, the signal to noise ratio is further improved by coating the face-plate of CRT 10 with a multi-layer anti-reflective coating, rather than conventional silica or spun coating which tend to diffuse the spot. It is preferable for CRT 10 to comprise a 17 inch screen to permit acceptance of a full A4 page of a document sideways on.

In yet another modification to the preferred embodiment of the present invention hereinbefore described, image processor 140 comprises a 2D optical correlator and frame store 150 comprises a plurality of planes each for storing a different bit map of the scanned image. In operation, the correlator utilizes the image recorded in a previous frame as a "template" for the image scanned in a current frame. Specifically, during a first frame, the electron beams are generated as a function of the R', G', and B' video signals produced by the DAC of image processor 140 to scan a uniform white frame. Photo-detector 160 detects light and dark regions of the document being scanned. The detected light and dark regions are read by image processor 140 via the DATA line and stored in a first plane of frame buffer 150. In a second, subsequent frame, image processor 140 accesses the first plane of frame buffer 150 and inverts the contents thereof. The DAC in image processor 140 now generates video signals R', G' and B' as functions of the inverted contents of the first plane of frame buffer 150. During the second frame, the image detected by photo-detector 160 is stored by image processor 140 in a second plane of frame buffer 150. Regions of high reflectivity (e.g.: white) in the first frame are now dark (e.g.: black). These regions are thus not scanned during the second frame. Regions of low reflectivity (e.g.: black) in the first frame are now white. Therefore, these regions are scanned in the second frame. The reduced mass of the reflective regions of the document effectively increases the signal to noise ratio of the scanning apparatus. Thus, a sharper image is recorded in the second plane of frame buffer 150 during the second frame. The image stored in the second plane of frame buffer 150 may now be utilized to form the template for a subsequent scan if further enhancement is required. The process may then be repeated for successive frames until negligible further enhancement is made. It will be appreciated that, in some embodiments of the present invention, image processor 140 may be implemented at least partially by a microprocessor and the optical correlator may be at least partially implemented by program code for configuring the microprocessor. It will also be appreciated that, in some embodiments of the present invention, image enhancement may be achieved by over-writing the same plane of frame buffer 150 with data from successive scans; the image signals for each successive scan being provided by data stored in the plane during the previous scan.

In some embodiments of the present invention, image processor 140 may be configured to provide further image enhancement by for example fourier transforms and thresholding. Furthermore, in some embodiments of the present invention, the enhanced image may be sent from frame buffer 150 via data link D to a host computer system unit for further image enhancement.

Decay times for a typical phosphor such as type P22 phosphor are 60 microseconds for green, 25 microseconds for blue, and 350 microseconds for red. Thus, for a typical CRT 10 scanning at or near 30 kHz, the electron beams appear as a horizontal strip occupying more than one line of pixels. It will be appreciated that such a strip may be unsuitable for high resolution scanning. In a modification to the preferred embodiment of the present invention hereinbefore described, when in scanning mode, deflection currents are provided to the line and frame deflection coils via separate scan circuits arranged to permit any desired addressability of the screen, limited only by shadow mask resolution. It is also desirable for video amplifier 50 to include a DC path or at least a long time constant to maintain drive signals at the cathodes of CRT 10 during scanning operations. Alternatively, video signal R', G', and B' may be pulsed by image processor 140. It will be appreciated that, because in image scanning mode line and frame scan circuits 70 and 60 are controlled by sync signals H' and V', image processor 140 permits the line and frame scanning rates to be controlled to suit the phosphor decay period.

The preferred embodiment of the present invention hereinbefore described, together with modifications also described, are capable of monochrome scanning. Indeed, it will now be appreciated that, although examples the present invention has been described with reference to a color display system, the present invention is equally applicable to monochrome display systems where only monochrome scanning is desired. However, in another modification to the preferred embodiment of the present invention hereinbefore described, image processor 140 and frame store 150 are adapted to provide color scanning. Specifically, frame store 150 comprises three planes schematically represented at 140R, 140G and 140B in FIG. 6, each corresponding to a different one of the primary colors, Red, Green, and Blue produced in CRT 10. Each of the primary colors occupies a different band of wavelengths. Photo-detector 160 is replaced by three photo-detectors, schematically represented at 160R, 160G and 160B in FIG. 6, each sensitive to a different one of wavelength bands of the primary colors. In operation, during scanning, the output of each photo-detector is stored in the corresponding plane of frame buffer 150 by image processor 140. In another modification of the preferred embodiment of the present invention hereinbefore described, color scanning is effected via a single photo-detector 160. Image processor 140 is configured to sequentially generate video signals R', G' and B' to successively display, a red frame, a green frame, and a blue frame. The output of photo-detector 160 for each of the red, green, and blue frames is stored in a corresponding plane of frame store 150.

In some embodiments of the present invention, each pixel of the scanned image may be represented by a 1 bit digital word in the quantised signal produced by the ADC associated with photo-detector 160. Such embodiments are useful for scanning, for example, text documents in the form of black characters on a white background. In other embodiments of the present invention, each pixel of the scanned image may be represented by an N bit digital in the quantised signal produced by photo-detector 160. Each plane of frame buffer 150 is adapted to store the N bit word corresponding to each pixel of the scanned image. This permits a grey scale image to be recorded in frame buffer 150. The grey scale image recorded in frame buffer 150 during the previous frame may be inverted by image processor 140 and fed back via the DAC in image processor 140 to video amplifier 50 during a current frame to provide grey scale image enhancement during document scanning.

It will be appreciated that, as the scan progresses, the path length between the light spot and photo-detector 160 changes. There may be some absorption of light within the glass of the face-plate of CRT 10. Because of the varying path length of the light from the scanning spot to photo-detector 160, absorption may produce a corresponding variation in grey-scale across the face-plate. The absorption is function of the glass of the face-plate. Absorption coefficients may vary from one display system to another. However, the absorption coefficient of a display system will not vary during the life-time of the display system. In another modification of the preferred embodiment of the present invention hereinbefore described, image processor 140 is configured to compensate for the aforementioned absorption and frame buffer 150 comprises a non-volatile plane. To compensate for the absorption, initially a white sheet is placed over the face-plate of CRT 10. Image processor 140 then scans the sheet with a uniform white frame. The digitized image of the sheet output from photo-detector 160 is recorded in the non-volatile plane of frame buffer 150. The value of each pixel of the digitized image of the sheet is a measure of the attenuation of light at the corresponding point on the face-plate due to the absorption coefficient of the face-plate. During subsequent scanning operations, the values stored in the non-volatile plane are applied to each pixel value of scanned images. It will be appreciated that each pixel value read from photo-detector 160 may be modified by image processor 160 as a function of the corresponding attenuation value stored in the non-volatile plane prior to storage in frame buffer 150. Determination of the attenuation values may be performed either during manufacture of the display system or alternatively as a user option.

In a further modification of the preferred embodiment of the present invention hereinbefore described, image processor 140 comprises compression means for compressing the scanned image. The compression may be performed prior to recording the scanned image in frame buffer 150 thereby reducing the size of frame buffer 150. Alternatively, image processor 140 may perform the compression prior to sending the stored image to a host computer system unit via data link D, thereby reducing data traffic on link D.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patents is:

1. A combination display and scanning system both for producing a video picture and for optically scanning an article, the system comprising:
   display apparatus including
      (i) a display screen, and
      (ii) drive means for scanning a light beam across the display screen in response to a video signal to produce a video picture on the display screen; and
   image scanning apparatus including
      (i) photo-detection means optically coupled to the display screen for detecting a portion of the light beam that is reflected back into the display screen by an article placed adjacent the display screen and that is internally reflected within the display screen, and for generating image signals in response to the detected, reflected portion of the light beam, and (ii) storage means for storing the image signals generated by the photo-detection means.

2. A display system as claimed in claim 1, wherein the image scanning apparatus comprises a controller for generating the video signal.

3. A display system as claimed in claim 2, wherein the controller comprises image enhancement means for generating the video signal for a current frame as an inverse function of the image signal stored in the frame store during a previous frame.

4. A display system as claimed in claim 1, wherein each pixel of the image signal is represented in the frame store by an N bit word where N is an integer greater than one.

5. A display system as claimed in claim 1, wherein the image scanning apparatus comprises means for compensating the image signal stored in the frame store for absorption of light by the display screen.

6. A display system as claimed in claim 1, wherein the image scanning apparatus comprises means for compressing the image signal detected by the photo-detection means.

7. A display system as claimed in claim 1, wherein the image scanning apparatus comprises calibration means connected to the photo-detection means for determining a value indicative of ambient light detected by the photo-detection means and modifying the image signal generated by the photo-detection means as a function of the value.

8. A display system as claimed in claim 1, wherein the photo-detection means comprises a photo-detector secured to the display screen.

9. A display system as claimed in claim 1, wherein the image scanning apparatus comprises lens means for focusing the picture scanned onto the display screen onto the external article.

10. A display system as claimed in claim 9, wherein the lens means comprises a plurality of channels, and the photo-detection means comprises a plurality of photo-detectors each optically coupled to a different one of the channels.

11. A display system as claimed in claim 1, wherein the photo-detection means comprises a plurality of photo-detectors.

12. A display system as claimed in claim 1, wherein the image scanning apparatus comprises a shutter for preventing ambient light reaching the display screen.

13. A display system as claimed in claim 2, wherein the controller is adapted to sequentially generate video signals corresponding to a red frame, a green frame and a blue frame in series, and the frame store comprises a red plane, a green plane, and blue plane for storing image signals corresponding to the red frame, the green frame and the blue frame respectively.

14. A display system as claimed in claim 2, wherein the photo-detection means comprises at least one red photo-detector tuned to red light, at least one green photo-detector tuned to green light, and at least one blue photo-detector tuned to blue light, and the frame store comprises a red plane, a green plane, and a blue plane for storing image signals generated by the red, green, and blue photo-detectors respectively.

15. A computer system comprising: a system unit having a processor, memory, mass data storage means, data input and output means, and a display adaptor all interconnected by a bus architecture; and a display and scanning system as claimed in claim 1 releasably connectable to the display adaptor.

16. A computer system as claimed in claim 15, comprising a data communication link between the system unit and the display system for communicating data between the system unit and the image scanning apparatus of the display system.

* * * * *

UNITED STATES PATENT AND TRADEMARK OFFICE
CERTIFICATE OF CORRECTION

PATENT NO. : 6,052,118  
DATED : April 18, 2000  
INVENTOR(S) : John Beeteson et al.

Page 1 of 1

It is certified that error appears in the above-identified patent and that said Letters Patent is hereby corrected as shown below:

Title page,  
Item [75] Inventor, "Skelmorlie" should read -- Ayrshire --  
Item [56] References Cited, U.S. Patent Documents: "9/1997" should read -- 6/1997 --.

Column 8,  
Line 2, after "The shutter", insert -- schematically represented at 182 in FIG 5 --

Column 10, claim 1,  
Line 57, delete claim 1, insert claim 1 as follows:  
--A display system comprising a display screen and drive means for scanning a picture onto the display screen in response to video signal, characterized in that the system comprises image scanning apparatus comprising photo-detection means optically coupled to the display screen for generating an image signal on detection of any light from the scanned picture reflected back into the display screen by the picture and internally reflected within the display screen, and storage means for storing the image signal detected by the photo-detection means. --

Column 12, claim 15,  
Line 31, "display and scanning system" should read – display system --

Signed and Sealed this

Thirteenth Day of November, 2001

Attest:

*Attesting Officer*

NICHOLAS P. GODICI  
*Acting Director of the United States Patent and Trademark Office*